Nov. 1, 1927. 1,647,432

G. D. BUTLER

TRESTLE

Filed March 3, 1926  2 Sheets-Sheet 1

George D. Butler Inventor

By C. A. Snow & Co.
Attorneys

Nov. 1, 1927. 1,647,432

G. D. BUTLER

TRESTLE

Filed March 3, 1926     2 Sheets-Sheet 2

George D. Butler Inventor

By C. A. Snow & Co.
Attorneys

Patented Nov. 1, 1927.

1,647,432

UNITED STATES PATENT OFFICE.

GEORGE D. BUTLER, OF PHILLIPSBURG, NEW JERSEY.

TRESTLE.

Application filed March 3, 1926. Serial No. 92,065.

This invention aims to provide a simple means whereby the height of a trestle may be adjusted.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 4 is a side elevation;

Figure 5 is a cross section taken about on the line 5—5 of Figure 4, some parts remote from the cutting plane being in section also;

Figure 6 is a horizontal section taken about on the line 6—6 of Figure 5;

Figure 1:
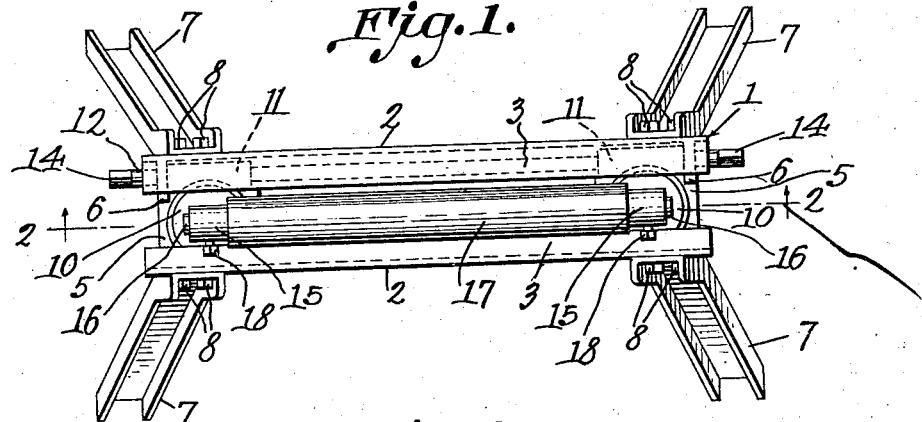
Figure 1 shows in top plan, a trestle constructed in accordance with the invention.
Figure 2:
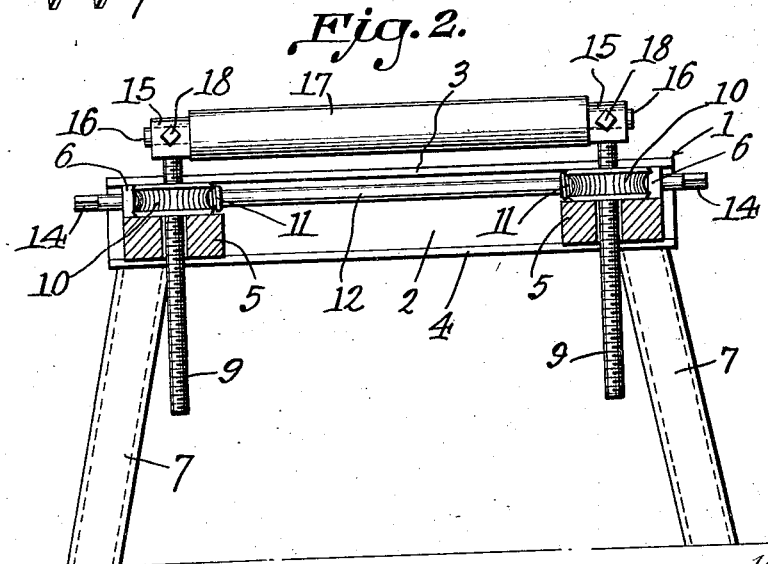
Figure 2 is a section on the line 2—2 of Figure 1.
Figure 3:
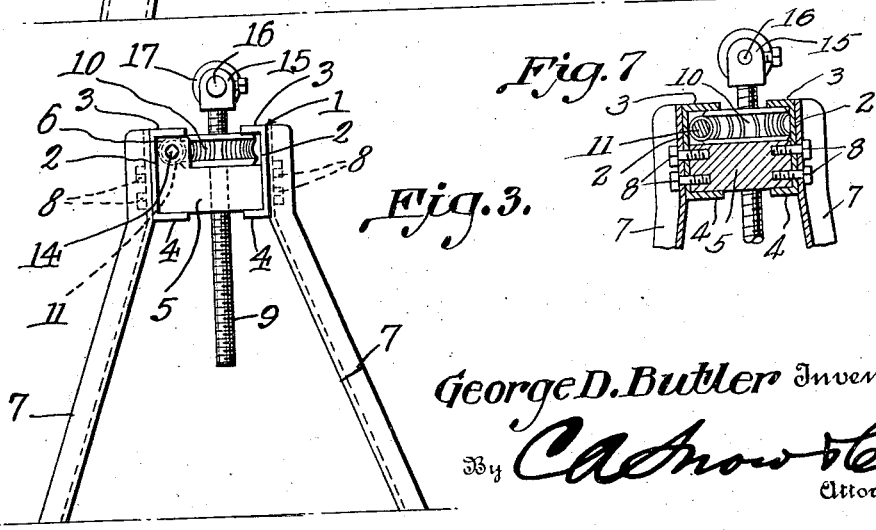
Figure 3 is an end elevation.
Figure 7:
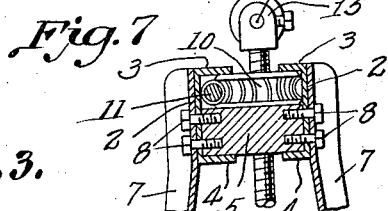
Figure 7 is a transverse section showing how the securing elements hold sundry parts together.

The trestle includes a frame 1. The frame 1 is made up of oppositely disposed side members 2. The side members 2 may be in the form of channels which are spaced apart transversely. The side members 2 have upper flanges 3 and lower flanges 4. Bearings 5 extend between the side members 2. The bearings 5 preferably are in the form of blocks. They are supported on the lower flanges 4. At one side, and at its outer end, each bearing block 5 has an upstanding wing 6. The wing 6 extends upwardly into engagement with one of the upper flanges 3. This strengthens the trestle. The frame 1 includes diverging legs 7. The upper ends of the legs 7 are connected by securing devices 8 to the side members 2. The securing devices 8 also engage and hold in place the bearing blocks 5.

Supports 9, in the form of screws, extend downwardly through the bearing blocks 5. The screws 9 are not threaded into the bearing blocks 5. The screws 9, however, are threaded into worm wheels 10. The worm wheels 10 rest on the bearing blocks 5. The flanges 3 overhang the worm wheels 10 and hold them down, without interfering with their rotation. The worm wheels 10 cooperate with worms 11. The worms 11 are on a horizontal shaft 12. The shaft 12 is journaled in the wings 6. It is housed beneath one of the flanges 3. The shaft 12 has squared ends 14, so that it can be turned readily by a key or crank (not shown). There are bearings 15 on the upper ends of the screws 9. In the bearings 15 are journaled trunnions 16 at the end of a roller 17. Set screws 18 are threaded into the bearings 15. The set screws 18 may be made to bear on the trunnions 16 and thus hold the roller 17 against turning, in the event that the operator has no use for a roller. The roller then becomes a rigid connection between the upper ends of the screws 9.

The shaft 12 may be rotated, rotation being imparted to the worms 11, the worm wheels 10 being rotated, and the supports 9, with the roller 17, being raised or lowered, as occasion may demand.

What is claimed is:—

1. In a device of the class described, a frame comprising spaced channel members including upper and lower flanges, a bearing supported on the lower flanges and provided with a wing engaging one of the upper flanges for reinforcement, a screw located between the channel members and movable longitudinally in the bearing, a worm wheel whereinto the screw is threaded, the worm wheel being retained between the bearing and the upper flanges, a work-supporting means mounted on the screw, and a shaft having a worm meshing with the worm wheel, the shaft being journaled in the wing and housed beneath one of the upper flanges.

2. In a device of the class described, a frame comprising spaced channel members including upper and lower flanges, bearings supported on the lower flanges, legs engaging the channel members, securing elements connecting the legs with the channel members and engaging the bearings to hold the channel members on the bearings, screws located between the channel members and movable longitudinally in the bearings, worm wheels whereinto the screws are threaded, the worm wheels being retained between the bearings and the upper flanges, work-supporting means on the screws, a shaft having worms meshing with the worm wheels, the shaft being housed beneath one of the upper flanges, and means for supporting the shaft for rotation on the bearings.

In testimony that I claim the foregoing as my own, I have hereto affixed my signature.

GEORGE D. BUTLER.